(12) United States Patent
Hu et al.

(10) Patent No.: US 8,579,319 B2
(45) Date of Patent: Nov. 12, 2013

(54) BABY CARRIAGE

(75) Inventors: Jie Hu, Jiangsu (CN); Zhenghuan Song, Jiangsu (CN)

(73) Assignee: Goodbaby Child Products Co., Ltd., Kunshan (CN)

( * ) Notice: Subject to any disclaimer, the term of this patent is extended or adjusted under 35 U.S.C. 154(b) by 0 days.

(21) Appl. No.: 13/521,719

(22) PCT Filed: Dec. 31, 2010

(86) PCT No.: PCT/CN2010/080646
§ 371 (c)(1),
(2), (4) Date: Oct. 15, 2012

(87) PCT Pub. No.: WO2011/085635
PCT Pub. Date: Jul. 21, 2011

(65) Prior Publication Data
US 2013/0119641 A1    May 16, 2013

(30) Foreign Application Priority Data

Jan. 12, 2010    (CN) .......................... 2010 1 0004229

(51) Int. Cl.
*B62B 1/00*    (2006.01)
(52) U.S. Cl.
USPC ........................................... 280/642; 280/658
(58) Field of Classification Search
USPC ...................... 280/33.993, 47.38, 47.41, 639, 280/642–644, 647–650, 658
See application file for complete search history.

(56) References Cited

U.S. PATENT DOCUMENTS

| | | | | |
|---|---|---|---|---|
| 5,979,928 A * | 11/1999 | Kuo | | 280/642 |
| 6,203,054 B1 * | 3/2001 | Matsumoto | | 280/647 |
| 7,694,980 B2 * | 4/2010 | Dotsey et al. | | 280/47.371 |
| 2007/0013168 A1 * | 1/2007 | Li | | 280/642 |
| 2007/0085302 A1 * | 4/2007 | You et al. | | 280/642 |
| 2011/0241395 A1 * | 10/2011 | Homan et al. | | 297/250.1 |
| 2013/0119641 A1 * | 5/2013 | Hu et al. | | 280/642 |

* cited by examiner

*Primary Examiner* — John Walters
*Assistant Examiner* — James Triggs
(74) *Attorney, Agent, or Firm* — Stephen C. Beuerle; Procopio Cory Hargreaves & Savitch LLP

(57) ABSTRACT

A baby buggy having a frame structure that can be folded quickly, easily, and in a small frame volume.

10 Claims, 9 Drawing Sheets

BABY CARRIAGE

FIELD OF THE INVENTION

The present invention relates to a baby buggy.

DESCRIPTION OF THE RELATED ART

In the prior art, a baby buggy generally comprises a foldable frame and wheel assemblies disposed at the bottom of the frame, wherein the frame is locked by a locking device when it is unfolded. Furthermore, the buggy frame foldable can be constructed in various ways to make itself able to be folded. However, in the industry development of baby buggy, it is an object being worth seeking and searching to make the folding of the buggy frame easier and the frame volume after folding be smaller and the like.

SUMMARY OF THE INVENTION

The technical problem to be solved by the invention is to provide a baby buggy which can be folded quickly and easily.

In order to solve the above technical problem, the present invention provides the following technical solution: a baby buggy comprising a foldable frame, a locking device for locking the frame, wheel assemblies disposed at the bottom of the frame and a seat set on the frame, wherein the frame comprises a front wheel bracket; a right rear wheel bracket, which has an upper portion being rotatably connected to a rear portion of the front wheel bracket by a first rotating shaft; a left rear wheel bracket, which has an upper portion being rotatably connected to the rear portion of the front wheel bracket by a second rotating shaft; a right push rod; a right push rod; a right rear supporting rod, which has an upper portion being rotatably connected to the right push rod by a seventh rotating shaft, and a lower portion being rotatably connected to the rear portion of the front wheel bracket by a third rotating shaft; a left rear supporting rod, which has an upper portion being rotatably connected to the left push rod by an eighth rotating shaft, and a lower portion being rotatably connected to the rear portion of the front wheel bracket by a fourth rotating shaft. The front wheel bracket has front wheel rods extending along an anteroposterior direction. The front wheel rods are provided with a sliding part slidably arranged thereon, the sliding part being rotatably connected to a first driving rod by a fifth rotating shaft. The first driving rod has an upper portion being rotatably connected to a lower portion of the right push rod by a ninth rotating shaft, and has a lower portion being rotatably connected to the left rear wheel bracket by a twelfth rotating shaft. The sliding part is also rotatably connected to a second driving rod by a sixth rotating shaft. The second driving rod has an upper portion being rotatably connected to a lower portion of the left push rod by a tenth rotating shaft, and has a lower portion being rotatably connected to the right rear wheel bracket by an eleventh rotating shaft.

According to a specified embodiment of the present invention, the axes of the second rotating shaft, the third rotating shaft, the fifth rotating shaft, the seventh rotating shaft, the ninth rotating shaft and the twelfth rotating shaft are parallel to each other and a first plane perpendicular to such axes intersects with a second plane which is perpendicular to the axes of the first rotating shaft, the fourth rotating shaft, the sixth rotating shaft, the eighth rotating shaft, the tenth rotating shaft and the eleventh rotating shaft which are parallel to each other. owning to the intersecting of the first and second planes, the left push rod and the right push rod draw close to each other when moving forwards, and the left rear wheel bracket and the right rear wheel bracket also draw close to each other when turning forwards, thus, the frame volume can be reduced not only in up-down, front-back directions but also in left-right direction.

According to a more specific embodiment of the present invention, the frame also includes a foldable transverse brace for laterally supporting the left push rod and the right push rod.

According to a more specific embodiment of the present invention, the frame also includes a right push handle with its lower end being rotatably connected to an upper end of the right push rod, and a left push handle with its lower end being rotatably connected to an upper end of the left push rod, wherein the two ends of the transverse brace is respectively rotatably connected to the right push handle and the left push handle.

According to a specified embodiment of the present invention, the third rotating shaft is located above the first rotating shaft, and the fourth rotating shaft is located above the second rotating shaft.

According to a specific embodiment of the present invention, the front wheel rods include a left front wheel rod positioned at the left side of the front wheel bracket and a right front wheel rod positioned at the right side of the front wheel bracket. Furthermore, the left front wheel rod and the right front wheel rod are respectively inserted into a left through hole and a right through hole respectively being opened at left and right sides of the sliding part.

According to a more specific embodiment of the present invention, the left front wheel rod and the right front wheel rod are fixed to each other forming a whole.

According to a more specific embodiment, the first driving rod and the second driving rod are situated between the left front wheel rod and the right front wheel rod.

According to a specific embodiment, the front wheel bracket further includes a connecting seat positioned at its rear portion, and the connecting seat is connected fixedly to the front wheel rods.

According to a specific embodiment, the first driving rod is rotatably connected to the right side of the sliding part by a fifth rotating shaft, and the second driving rod is rotatably connected to the left side of the sliding part by a sixth rotating shaft.

The scope of the invention is not limited to the technical schemes combined particularly by the above-mentioned technical features, other technical schemes combined discretionarily by the above-mentioned technical features or equivalent features should also be covered in the present invention, such as the technical schemes formed by exchanging the aforementioned features with the technical features having the similar functions, including but not limited to, disclosed in the invention.

Due to utilizing the above technical solution, the present invention has the following advantages as compared with the prior art: in the course of folding, pressing down the right push rod and left push rod make both the right rear supporting rod and left rear supporting rod turn forwards, meanwhile, the right push rod and left push rod respectively drives the first driving rod and the second driving rod aslant moving downwards and forwards, and thus drives the sliding part sliding down along the front wheel rods, and the left rear wheel bracket and the right rear wheel bracket turn forwards until the folding is achieved.

Figure 1:
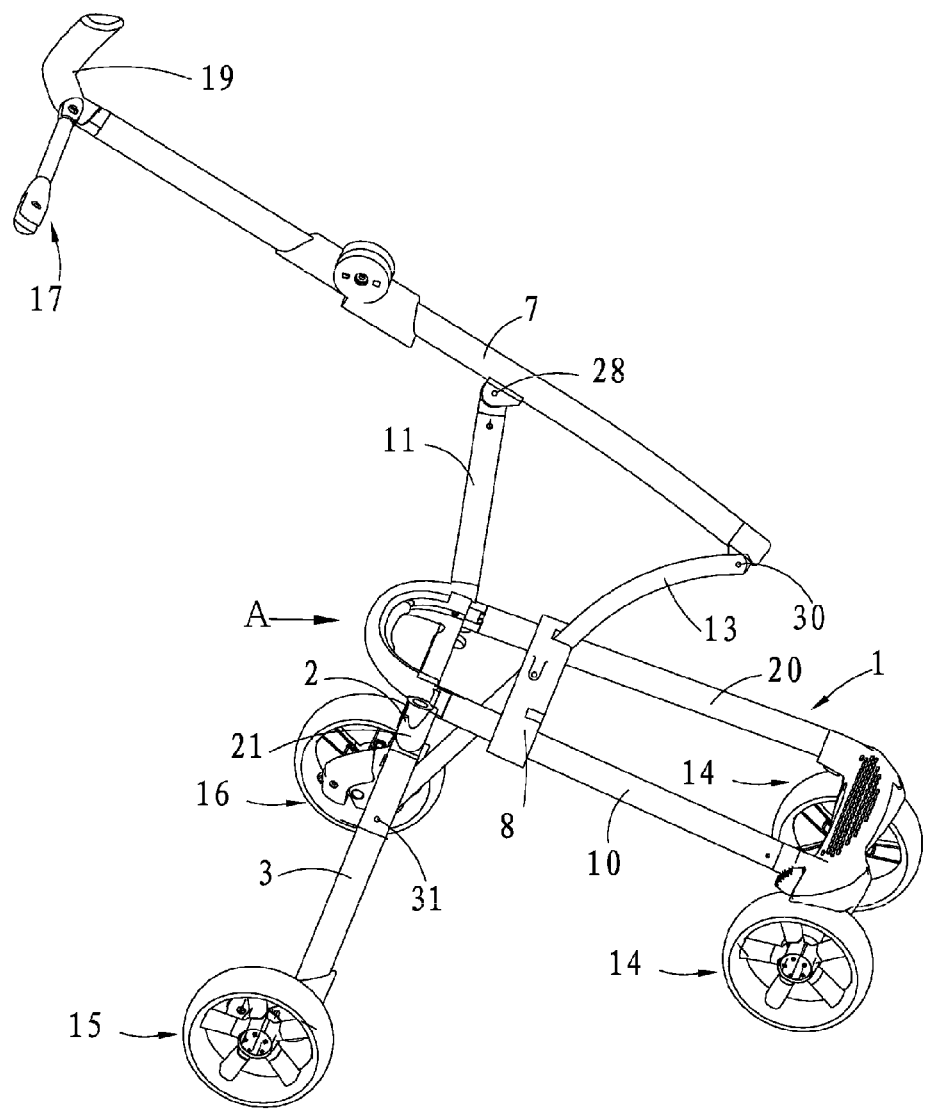
FIG. 1 is a perspective view of a baby buggy in an unfolded status with omitting the right push rod.

Wherein, 1. a front wheel bracket; 2. a connecting seat; 3. right rear wheel bracket; 5. left rear wheel bracket; 6. a right push rod; 7. a left push rod; 8. a sliding part; 9. a right rear supporting rod; 10. a left front wheel rod; 11. a left rear supporting rod; 12. a first driving rod; 13. a second driving rod; 14. front wheel assemblies; 15. a right rear wheel assembly; 16. a left rear wheel assembly; 17. a transverse brace; 18. a right push handle; 19. a left push handle; 20. a right front wheel rod; 21. a first rotating shaft; 22. a second rotating shaft; 23. a third rotating shaft; 24. a fourth rotating shaft; 25. a fifth rotating shaft; 26. a sixth rotating shaft; 27. a seventh rotating shaft; 28. a eighth rotating shaft; 29. a ninth rotating shaft; 30. a tenth rotating shaft; 31. a eleventh rotating shaft; 32. a twelfth rotating shaft; a. a first plane; b. a second plane.

DETAILED DESCRIPTION OF THE PREFERRED EMBODIMENTS

Referring to the embodiments shown in FIGS. 1 to 10, the baby buggy comprises a frame provided with an unfolded position and a folded position; front wheel assemblies 14; a right rear wheel assembly 15; a left rear wheel assembly 16; a locking device for locking the frame in an unfolded position; and a seat (not shown) set on the frame for children sitting or lying. The words of "front", "rear", "left" and "right" referring to orientation herein and hereinafter are defined according to the impression of a user, the further side from he/she is designated as "front", the side adjacent to he/she is designated as "rear", the side on his/her left is designated as "left", and the side on his/her right is designated as "right".

Figure 2:
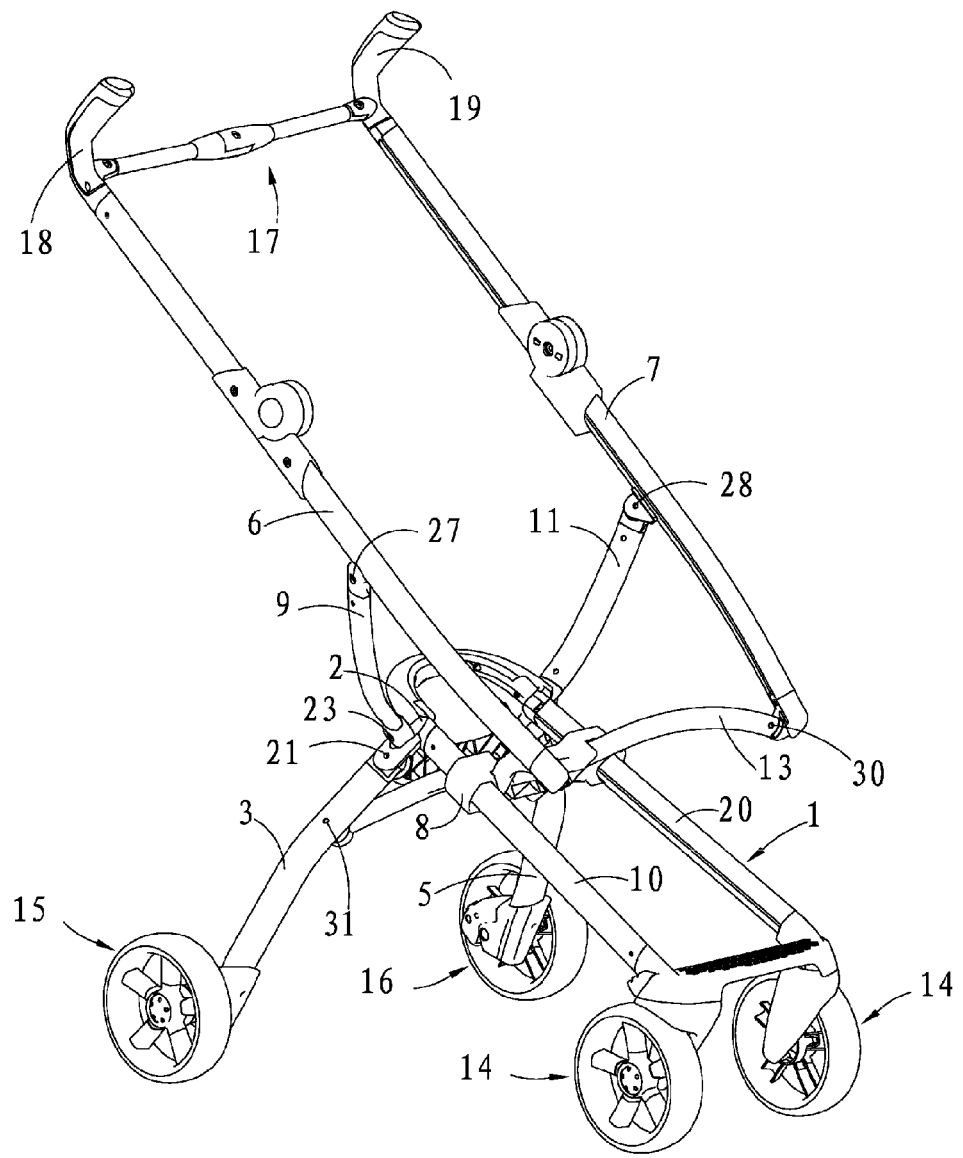
FIG. 2 is a perspective view of a baby buggy in an unfolded status.
Figure 3:
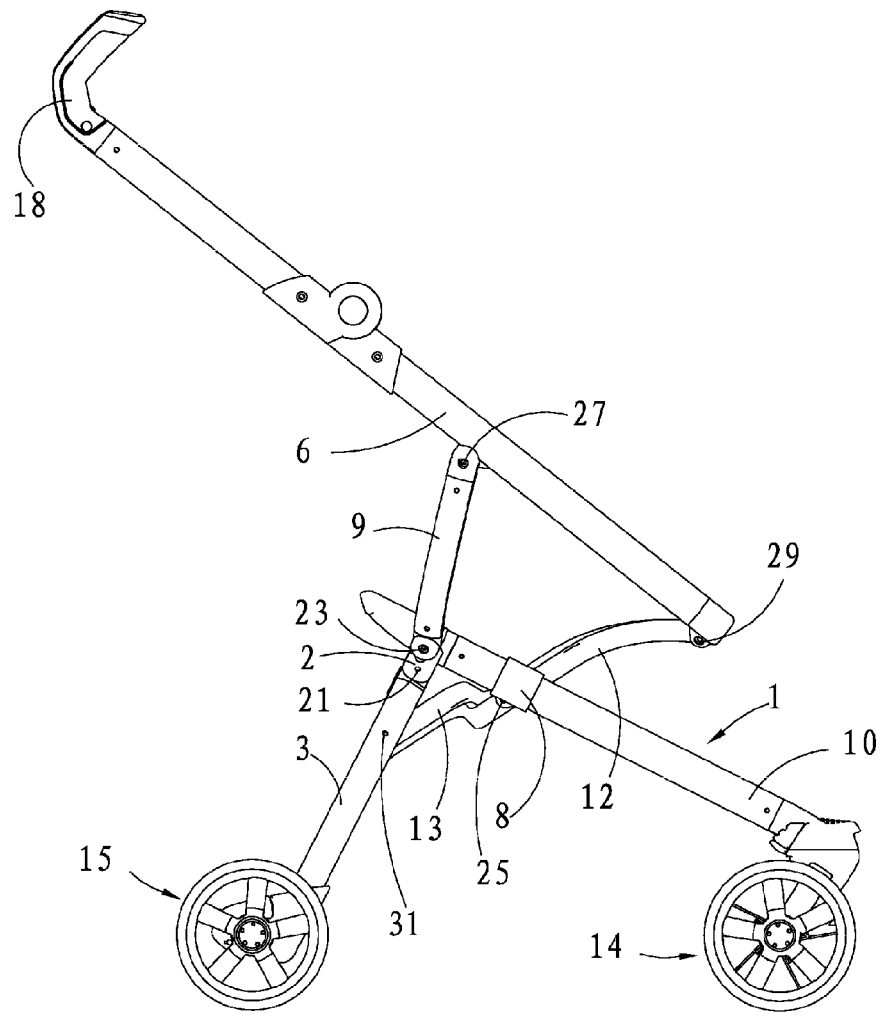
FIG. 3 is a front view of a baby buggy in an unfolded status.
Figure 4:
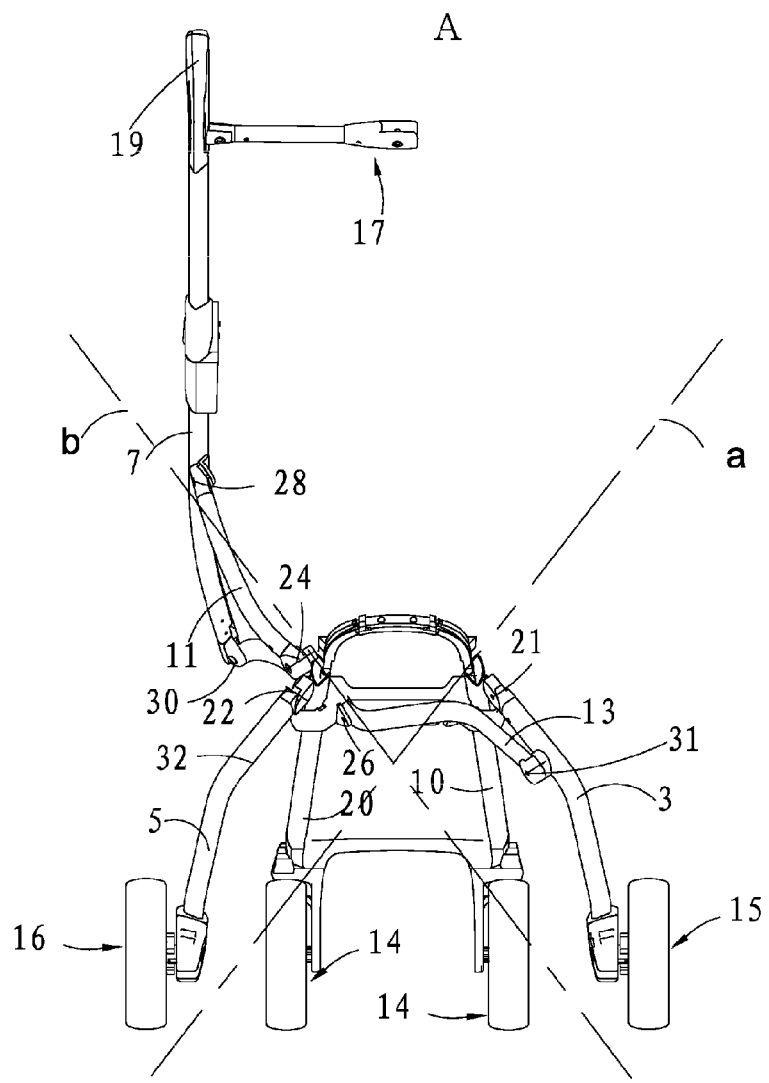
FIG. 4 is the view A of the FIG. 1.
Figure 5:
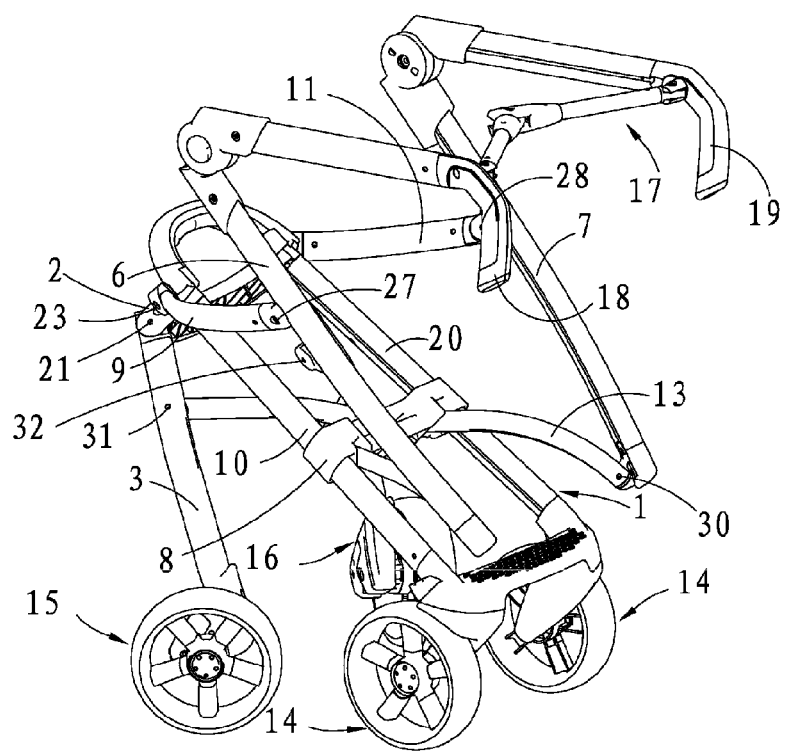
FIG. 5 is a perspective view of a baby buggy in the course of transformation from an unfolded status to a folded status.
Figure 6:
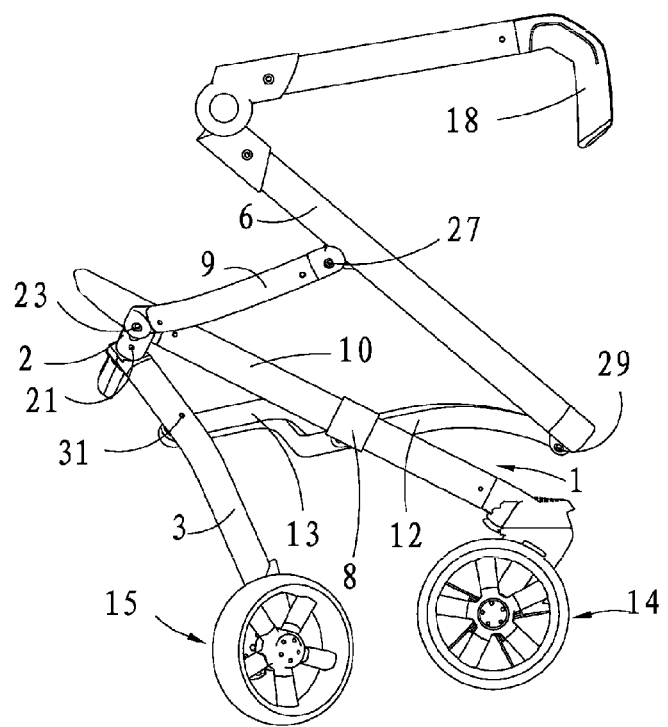
FIG. 6 is a front view of a baby buggy in the course of converting from an unfolded status to a folded status.
Figure 7:
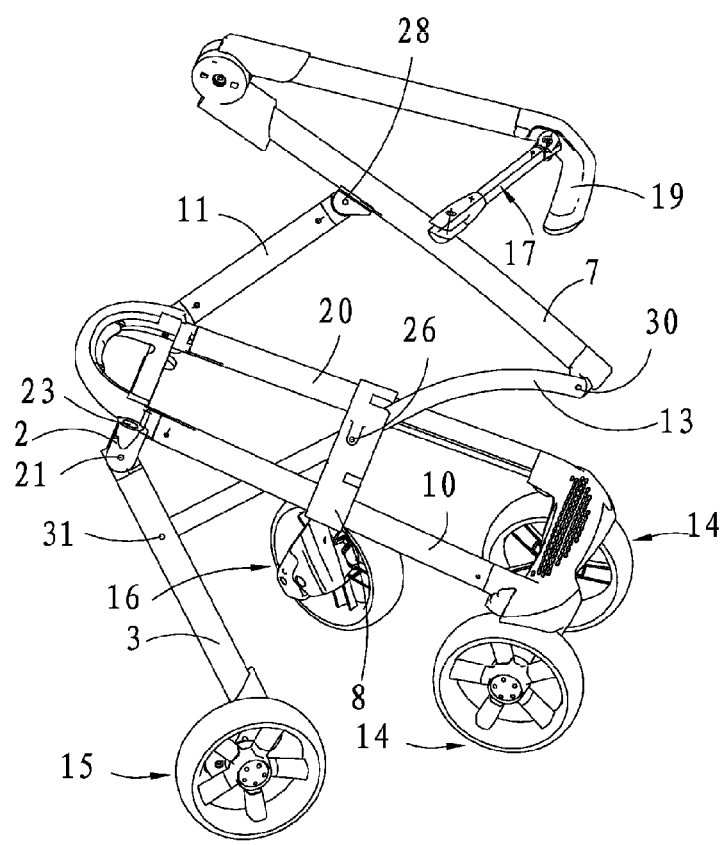
FIG. 7 is a perspective view of a baby buggy in the course of converting from an unfolded status to a folded status, with omitting the right push rod.
Figure 8:
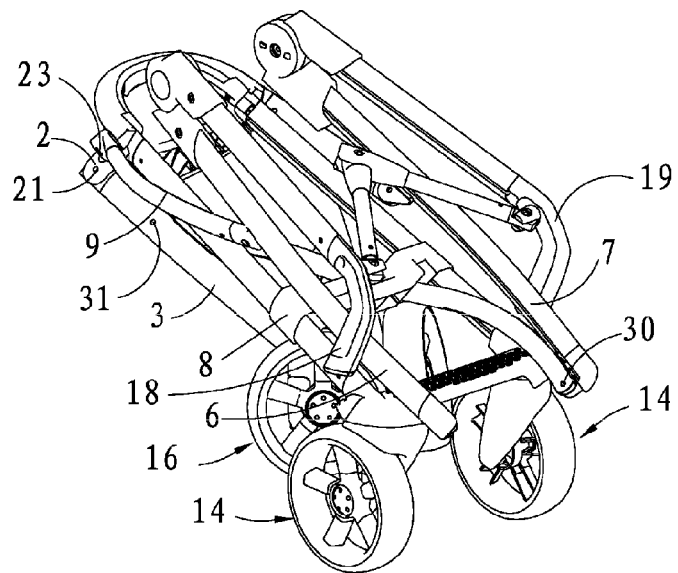
FIG. 8 is a perspective view of a baby buggy in an unfolded status.
Figure 9:
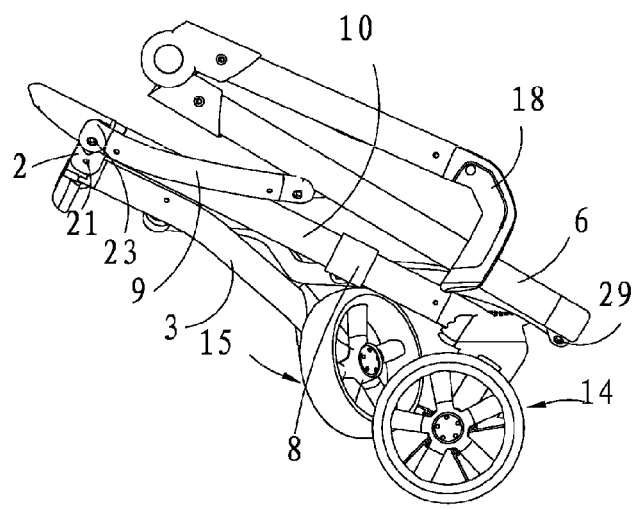
FIG. 9 is a front view of a baby buggy in a folded status.
Figure 10:
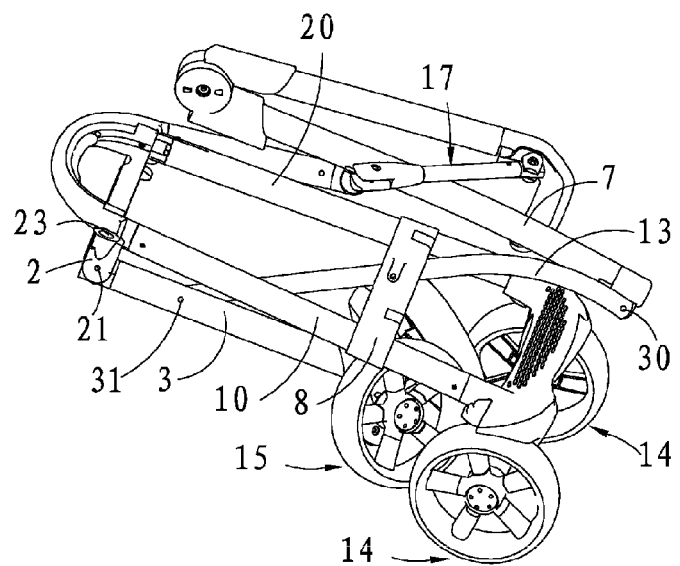
FIG. 10 is a front view of a baby buggy in a folded status with omitting the right push rod.

As shown in figures, the frame comprises:

a front wheel bracket 1 having front wheel rods extending along an anteroposterior direction, the front wheel assemblies 14 are arranged below the front portions of which, in this embodiment, two front wheel assemblies 14 are respectively arranged below the front portions of the left and right sides of the front wheel bracket 1;

a right rear wheel bracket 3, the upper portion of which is rotatably connected to the right side of the rear portion of the front wheel bracket 1 by a first rotating shaft 21, and the lower portion of which is provided with the right rear wheel assembly 15;

a left rear wheel bracket 5, as shown in FIG. 4, the upper portion of which is rotatably connected to the left side of the rear portion of the front wheel bracket 1 by a second rotating shaft 22, and the lower portion of which is provided with the left rear wheel assembly 16;

a right push rod 6;

a left push rod 7;

a sliding part 8, which is slidably arranged on the front wheel rods along the anteroposterior direction thereof;

a right rear supporting rod 9, the upper portion of which is rotatably connected to the right push rod 6 by a seventh rotating shaft 27, and the lower portion of which is rotatably connected to the right side of the rear portion of the front wheel bracket 1 by a third rotating shaft 23;

a left rear supporting rod 11, the upper portion of which is rotatably connected to the left push rod 7 by a eighth rotating shaft 28, and the lower portion of which is rotatably connected to the left side of the rear portion of the front wheel bracket 1 by a fourth rotating shaft 24;

a first driving rod 12, as shown in FIG. 3, being rotatably connected to the sliding part 8 by a fifth rotating shaft 25, the upper portion of which is rotatalby to the lower portion of the right push rod 6 by a ninth rotating shaft 29, as shown in FIGS. 4-5, and the lower portion of which is rotatably connected to the left rear wheel bracket 5 by a twelfth rotating shaft 32;

a second driving rod 13 being rotatably connected to the sliding part 8 by a sixth rotating shaft 26, the upper portion of which is rotatably connected to the lower portion of the left push rod 7 by a tenth rotating shaft 30, and the lower portion of which is rotatably connected to the right rear wheel bracket 3 by a eleventh rotating shaft 31; As shown in FIGS. 2-4, the shaft axes of the second rotating shaft 22, third rotating shaft 23, fifth rotating shaft 25, seventh rotating shaft 27, ninth rotating shaft 29 and the twelfth rotating shaft 32 are parallel to each other, and the plane perpendicular to such shaft axes is defined as a first plane a, as shown in FIG. 4, the shaft axes of the first rotating shaft 21, fourth rotating shaft 24, sixth rotating shaft 26, eighth rotating shaft 28, tenth rotating shaft 30 and the eleventh rotating shaft 31 are parallel to each other, and the plane perpendicular to such shaft axes is defined as a second plane b, wherein the first plane a and second plane b intersects with each other.

The frame also includes a transversely foldable transverse brace 17 which make the rigidity during the right push rod 6 and the left push rod 7 stronger when the frame is in an unfolded position.

As shown in figures, the frame also comprises a right push handle 18 with the lower end being rotatably connected to the right push rod 6, and a left push handle 19 with the lower end being rotatably connected to the upper end of the left push rod 7, wherein the right end of the transverse brace 17 is rotatably connected to the right push handle 18, and the left end of the transverse brace 17 is rotatably connected to the left push handle 19, in the course of frame folding, the right push handle 18 folds towards the right push rod 6, and the left push handle 19 folds towards the left push rod 7, the volume of the frame becomes smaller after folding. Alternatively, the right push handle 18 is slidably connected to the right push rod 6, and the left push handle 19 is slidably connected to the left push rod 7, thus, the volume of frame after folding can be reduced by shrinking slidably. Or alternatively, the right push handle 18 and the right push rod 6 are one-piece, and the left push handle 19 and the left push rod 7 are one-piece, thus, the volume of the frame after folding is big. The transverse brace 17 includes a first transverse brace rod and a second transverse brace rod, wherein the inner end of the first transverse brace rod is rotatably connected to the inner end of the second transverse brace rod, and the outer end of the first transverse brace rod is rotatably connected to the right push handle 18, and the outer end of the second transverse brace rod is rotatably connected to the left push handle 19. The transverse brace 17 also can be arranged between the left push rod 7 and the right push rod 6.

The third rotating shaft 23 is located above the first rotating shaft 21, and the fourth rotating shaft 24 is located above the second rotating shaft 22.

The front wheel rods include a left front wheel rod 20 positioned at the left side of the front wheel bracket 1 and a right front wheel rod 10 positioned at the right side of the front wheel bracket 1. The left front wheel rod 20 and the right front wheel rod 10 are set fixedly forming a whole. A left through hole and a right through hole respectively are opened at the left and right sides of the sliding part 8, the left front wheel rod 20 is inserted into the left through hole and the right front wheel rod 10 is inserted into the right through hole. The first driving rod 12 and the second driving rod 13 are situated between the left front wheel rod 20 and the right front wheel rod 10. The front wheel bracket 1 further includes a connecting seat 2 positioned at the rear portion thereof, the connecting seat 2 is connected fixedly to the front wheel rods.

The first driving shaft 12 is rotatably connected to the right side of the sliding part 8 by a fifth rotating shaft 25, and the second driving shaft 13 is rotatably connected to the left side of the sliding part 8 by a sixth rotating shaft 26.

In the course of folding, pressing down the right push rod 6 and left push rod 7 make both the right rear supporting rod 9 and left rear supporting rod 11 turn forwards, meanwhile, the right push rod 6 and left push rod 7 respectively drives the first driving rod 12 and the second driving rod 13 moving downwards, and thus drives the sliding part 8 sliding down, and the left rear wheel bracket 3 and the right rear wheel bracket 5 turning forwards, besides, the right rear wheel bracket 3 and the left rear wheel bracket 5 draw close to each other, the right push rod 6 and the left push rod 7 draw close to each other, and the right rear supporting rod 9 and the left rear supporting rod 11 also draw close to each other, and accordingly the folding is achieved. The volume of frame after folding is small.

As described above, the detailed description is illustrated according to the spirit of the invention fully, but the present invention is not limited to the aforementioned embodiments and implementing methods. Many variations and implements can be made within the scope of the invention by those skilled in the related art.

What is claimed is:

1. A baby buggy comprising a foldable frame, a locking device for locking said frame, wheel assemblies disposed at the bottom of the frame, and a seat set on the frame, wherein the frame comprises:
   a front wheel bracket (1) having front wheel rods extending along an anteroposterior direction;
   a right rear wheel bracket (3), which is rotatably connected at its upper portion to a rear portion of the front wheel bracket (1) by a first rotating shaft (21);
   a left rear wheel bracket (5), which is rotatably connected at its upper portion to the rear portion of the front wheel bracket (1) by a second rotating shaft (22);
   a right push rod (6);
   a left push rod (7);
   a sliding part (8), which is slidably arranged on the front wheel rods along the anteroposterior direction thereof;
   a right rear supporting rod (9), which is rotatably connected at its upper portion to the right push rod (6) by a seventh rotating shaft (27), and rotatably connected at its lower portion to the rear portion of the front wheel bracket (1) by a third rotating shaft (23);
   a left rear supporting rod (11), which is rotatably connected at its upper portion to the left push rod (7) by an eighth rotating shaft (28), and rotatably connected at its lower portion to the rear portion of the front wheel bracket (1) by a fourth rotating shaft (24);
   a first driving rod (12), which is rotatably connected to the sliding part (8) by a fifth rotating shaft (25), the first driving rod (12) being rotatably connected at its upper portion to a lower portion of the right push rod (6) by a ninth rotating shaft (29), and rotatably connected at its lower portion to the left rear wheel bracket (5) by a twelfth rotating shaft (32); and
   a second driving rod (13) which is rotatably connected to the sliding part (8) by a sixth rotating shaft (26), the second driving rod (13) being rotatably connected at its upper portion to a lower portion of the left push rod (7) by a tenth rotating shaft (30), and rotatably connected at its lower portion to the right rear wheel bracket (3) by an eleventh rotating shaft (31).

2. The baby buggy as claimed in claim 1, wherein
   a first plane (a) which is perpendicular to the axes of the second rotating shaft (22), the third rotating shaft (23), the fifth rotating shaft (25), the seventh rotating shaft (27), the ninth rotating shaft (29), and the twelfth rotating shaft (32) which are parallel to each other, intersects with a second plane (b) which is perpendicular to the axes of the first rotating shaft (21), fourth rotating shaft (24), sixth rotating shaft (26), eighth rotating shaft (28), tenth rotating shaft (30) and the eleventh rotating shaft (31) which are parallel to each other.

3. The baby buggy as claimed in claim 1, wherein the frame further includes a foldable transverse brace (17) for laterally supporting the left push rod (7) and the right push rod (6).

4. The baby buggy as claimed in claim 3, wherein the frame further includes
   a right push handle (18) with a lower end being rotatably connected to an upper end of the right push rod (6); and
   a left push handle (19) with a lower end being rotatably connected to an upper end of the left push rod (7);
   wherein the two ends of the transverse brace (17) respectively being rotatably connected to the right push handle (18) and the left push handle (19).

5. The baby buggy as claimed in claim 1, wherein the third rotating shaft (23) is located above the first rotating shaft (21), and the fourth rotating shaft (24) is located above the second rotating shaft (22).

6. The baby buggy as claimed in claim 1, wherein the front wheel rods include
   a left front wheel rod (20) positioned at the left side of the front wheel bracket (1), which is inserted into a left through hole opened at the left side of the sliding part (8); and
   a right front wheel rod (10) positioned at the right side of the front wheel bracket (1), which is inserted into a right through hole opened at the right side of the sliding part (8).

7. The baby buggy as claimed in claim 6, wherein the left front wheel rod (20) and the right front wheel rod (10) are fixed to each other to form an integration.

8. The baby buggy as claimed in claim 6, wherein the first driving rod (12) and the second driving rod (13) are situated between the left front wheel rod (20) and the right front wheel rod (10).

9. The baby buggy as claimed in claim 6, wherein the front wheel bracket (1) further includes a connecting seat (2) at its rear portion, which is connected fixedly to the rear portions of the front wheel rods.

10. The baby buggy as claimed in claim 1, wherein the first driving shaft (12) is rotatably connected to the right side of the sliding part (8) by a fifth rotating shaft (25), and the second driving shaft (13) is rotatably connected to the left side of the sliding part (8) by a sixth rotating shaft (26).

\* \* \* \* \*